US007964290B2

(12) United States Patent
Mullner et al.

(10) Patent No.: US 7,964,290 B2
(45) Date of Patent: Jun. 21, 2011

(54) MAGNETIC MATERIAL WITH LARGE MAGNETIC-FIELD-INDUCED DEFORMATION

(75) Inventors: Peter Mullner, Boise, ID (US); Markus Chmielus, Boise, ID (US); David C. Dunand, Evanston, IL (US); Yuttanant Boonyongmaneerat, Bangkok (TH)

(73) Assignees: Boise State University, Boise, ID (US); Northwestern University, Evanston, IL (US)

( * ) Notice: Subject to any disclaimer, the term of this patent is extended or adjusted under 35 U.S.C. 154(b) by 457 days.

(21) Appl. No.: 12/203,112

(22) Filed: Sep. 2, 2008

(65) Prior Publication Data

US 2009/0092817 A1 Apr. 9, 2009

Related U.S. Application Data

(60) Provisional application No. 60/969,018, filed on Aug. 30, 2007.

(51) Int. Cl.
*B32B 5/18* (2006.01)

(52) U.S. Cl. ........ 428/613; 428/642; 428/655; 428/668; 428/678; 428/680; 428/681

(58) Field of Classification Search ........................ None
See application file for complete search history.

(56) References Cited

U.S. PATENT DOCUMENTS 5,958,154 A * 9/1999 O'Handley et al. ........... 148/312
6,034,887 A * 3/2000 Gupta et al. .................. 365/171
6,307,241 B1 * 10/2001 Awschalom et al. ......... 257/421
7,020,015 B1 * 3/2006 Hong et al. ................... 365/171
2006/0003185 A1 * 1/2006 Parkin ......................... 428/692.1
2006/0130758 A1 * 6/2006 Lohokare et al. ............. 118/715
2006/0222904 A1 * 10/2006 Hsia et al. ...................... 428/832
2008/0143195 A1 * 6/2008 Hampikian et al. ............ 310/26
2008/0225575 A1 * 9/2008 Mullner et al. ............... 365/157
2009/0092817 A1 * 4/2009 Mullner et al. ............ 428/304.4

FOREIGN PATENT DOCUMENTS

JP 2006-070286 * 3/2006
WO WO-2008/049124 * 4/2008
WO WO-2008/061166 * 5/2008

(Continued)

OTHER PUBLICATIONS

Boonyongmaneerat, et al. "Increasing Magnetoplasticity in Polycrystalline Ni-Mn-Ga by Reducing Internal Constraints through Porosity", Dec. 14, 2007, Physical Review Letters, vol. 99, pp. 247201-1-247210-4.

(Continued)

*Primary Examiner* — Ling Xu
(74) *Attorney, Agent, or Firm* — Pedersen and Company, PLLC; Ken J. Pedersen; Barbara S. Pedersen

(57) ABSTRACT

A magnetic materials construct and a method to produce the construct are disclosed. The construct exhibits large magnetic-field-induced deformation through the magnetic-field-induced motion of crystallographic interfaces. The construct is a porous, polycrystalline composite structure of nodes connected by struts wherein the struts may be monocrystalline or polycrystalline. If the struts are polycrystalline, they have a "bamboo" microstructure wherein the grain boundaries traverse the entire width of the strut. The material from which the construct is made is preferably a magnetic shape memory alloy, including polycrystalline Ni—Mn—Ga. The construct is preferably an open-pore foam. The foam is preferably produced with a space-holder technique. Space holders may be dissolvable ceramics and salts including $NaAlO_2$.

12 Claims, 9 Drawing Sheets

FOREIGN PATENT DOCUMENTS

WO WO-2009/029953 * 3/2009

OTHER PUBLICATIONS

Likhachev, et al. "Magnetic-field-controlled Twin Boundaries Motion and Giant Magneto-Mechanical Effects in Ni-Mn-Ga Shape Memory Alloy", Oct. 2, 2000, Physics Letters, A 275, pp. 142-151.
Banhart, "Properties and Applications of Cast Aluminum Sponges", Apr. 2000, Advanced Engineering Materials, 2, No. 4, pp. 188-191.
Mullner, "Between Microscopic and Mesoscopic Descriptions of Twin-Twin Interaction", Z. f. Metallkd, 97(2006) 3, pp. 205-216.
Boonyongmaneerat, et al. "Ni-Mo-Cr Foams Processed by Casting Replication of Sodium Aluminate Prefoams", 2008, Advanced Engineering Materials, vol. 10, No. 4, pp. 379-383.
Ullakko, et al. "Large Magnetic-Field-Induced Strains in Ni2MnGa Single Crystals", Sep. 23, 1996, Appl. Physi. Lett., 69 (13), pp. 1966-1968.
Mullner, et al. "Large Cyclic Magnetic-Field-Induced Deformation in Orthorhombic (14M) Ni-Mn-Ga Martensite", Feb. 2004, Journal of Applied Physics, vol. 95, No. 3., pp. 1531-1536.
Mullner, et al. "Large Cyclic Deformation of a Ni-Mn-Ga Shape Memory Alloy Induced by Magnetic Fields", Dec. 1, 2002, Journal of Applied Physics, vol. 92, No. 11, pp. 6708-6713.
Mullner, et.al. "Nanomechanics and Magnetic Structure of Orthohombic Ni-Mn-Ga Martensite", Materials Science and Engineering, A (2007), doi: 10.1016/J.Msea.2006,12.215.
Mullner, et. al. "Micromechanics of Magnetic-Field-Induced Twin-Boundary Motion In Ni-Mn-Ga Magnetic Shape-Memory Alloys", 2005, Solid-to-Solid Phase Transformations in Inorganic Materials 2005, TMS (The Minerals, Metals, & Materials Society), vol. 2, pp. 171-185.
Mullner, et. al. "The Force of a Magnetic/Electric Field on a Twinning Dislocation", Rapid Research Notes, Phy. Stat. Sol. (b) 208, R1 (1998) pp. R1-R2.

* cited by examiner

MAGNETIC MATERIAL WITH LARGE MAGNETIC-FIELD-INDUCED DEFORMATION

This application claims priority of Provisional Application Ser. No. 60/969,018, filed Aug. 30, 2007, and entitled "Magnetic Shape-Memory Structures and Foam with Large Magnetic-Field-Induced Deformation," which is hereby incorporated by reference.

This invention was made with government support under Grant Number DMR-0502551 awarded by the National Science Foundation. The government has certain rights in the invention.

FIELD OF THE INVENTION

The invention relates porous polycrystalline magnetic material having struts between nodes of the material which produce large reversible strain in response to an actuating magnetic field.

RELATED ART

Magnetic shape-memory alloys (MSMAs) have emerged into a new field of active materials enabling fast large-strain actuators. MSMA with twinned martensite tend to deform upon the application of a magnetic field. The magnetic-field-induced deformation can be reversible (magnetoelasticity) or irreversible (magnetoplasticity) after removal of the magnetic field. After first results had been obtained in 1996, magnetoplasticity has been studied intensively for off-stoichiometric $Ni_2MnGa$ Heusler alloys for which large magnetic-field-induced strains result from a large spontaneous strain in combination with a large magnetic anisotropy constant and high magnetic and martensitic transformation temperatures. The magnetoplastic effect is related to the magnetic-field-induced displacement of twin boundaries. On the microscopic scale, a twin boundary moves by the motion of twinning dislocations, a process which can be triggered by a magnetic force on the dislocation. In monocrystalline $Ni_2MnGa$, the cooperative motion of twinning dislocations finally leads to a strain of up to 10%, depending on martensite structure, and crystal orientation and quality.

Large magnetic-field-induced strains have so far been measured for magnetic shape-memory alloy single crystals. Growth of single crystals is difficult (in terms of maintaining alloy purity) and slow, and thus expensive. When growing alloy single-crystals, segregation can often not be avoided and is particularly strong for Ni—Mn—Ga. Segregation is adding to the difficulty of growing reproducibly the single crystals with identical composition and crystal stricture, which depends strongly on composition. Segregation can be avoided through quenching which however leads to a polycrystalline microstructure. It is, thus, for various reasons desirable to obtain MSMAs in polycrystalline form. Several attempts have been made to demonstrate magnetic-field-induced deformation in polycrystalline MSMA. Magnetic-field-induced strains of $1.4\times10^{-4}$ (0.014%) are considered "relatively large". Efforts were undertaken to improve the strain by producing severely textured alloys. Based on magnetic results, it was assumed that magnetic-field-induced twin boundary motion takes place in thin ribbons. However, strain measurements for this work revealed a total strain of only $2\times10^{-5}$ (0.002%).

Larger magnetic-field-induced strains (in the order of 0.01 or 1%) were reported for experiments where a magnetic field was applied during the martensitic phase transformation or when the sample was pre-stressed. These are valuable results and potentially important for certain applications. One of the main advantages of magnetoplasticity, however, is the independence of temperature and applied stress. Unlike the shape memory effect which makes use of temperature as an actuating parameter, magnetoplasticity takes place at constant temperature and therefore is fast.

No significant magnetic-field-induced deformation has been obtained so far for polycrystalline MSMA. The hindrance of magnetoplasticity in polycrystalline MSMAs is related to the micromechanism of magnetoplasticity, i.e. the motion of twinning dislocations (or disconnections) which is impeded by interfaces including twin boundaries and grain boundaries. Grain-boundary hardening is an efficient strengthening mechanism in metals and, therefore, suppresses also twin boundary motion in MSMAs. One strategy of the present inventors for improving magnetoplasticity has been to remove some of the grain boundaries and replace them by voids, for example, bulk alloys are replaced by alloy foams.

SUMMARY OF THE INVENTION

A constrict of magneto-mechanically active material including magnetic shape-memory alloys is proposed that enables large magnetic-field-induced strains without the requirement of single crystals. The construct comprises a polycrystalline composite of pores, struts and nodes. The struts connect nodes of the material in three dimensions to create a collection of pores, or cages. The pores may be open or closed, as in open-cell and closed cell foams, for example.

The struts may be monocrystalline or polycrystalline. If any strut is monocrystalline, a twin boundary must extend transversely across the entire strut. If any strut is polycrystalline, it must have a "bamboo" grain structure, which means that the grain boundaries traverse the entire width of the strut, and no grain boundary is parallel to the longitudinal axis of the strut. This way, there is no grain boundary interference to suppress twin boundary motion in any strut.

A strut may be long and thin, or it may also be as wide as it is long. In this latter case, the strut may be more accurately referred to as a "wall" between nodes. Grain structure and free surfaces of the struts enable a strong strain response of the struts to an actuating magnetic field.

The material of the present invention is preferably produced with a space holder technique known as replication. According to this preferred technique, dissolvable ceramics and salts including $NaAlO_2$ are infiltrated into a molten alloy to create spaces of ceramic/salt within the alloy which are dissolved out after the alloy has cooled to solid, leaving pores in the alloy. However, it is also contemplated by the inventors that other techniques for creating void spaces in the solid magnetic material may be used. For example, straight or jumbled bundles of fibers of the magnetic material may be fixed by sintering to create the requisite porosity. Also for example, chips or particulate bits of the magnetic material may be fixed by sintering to create the requisite porosity. Other conventional techniques may also be used.

Figure 1:
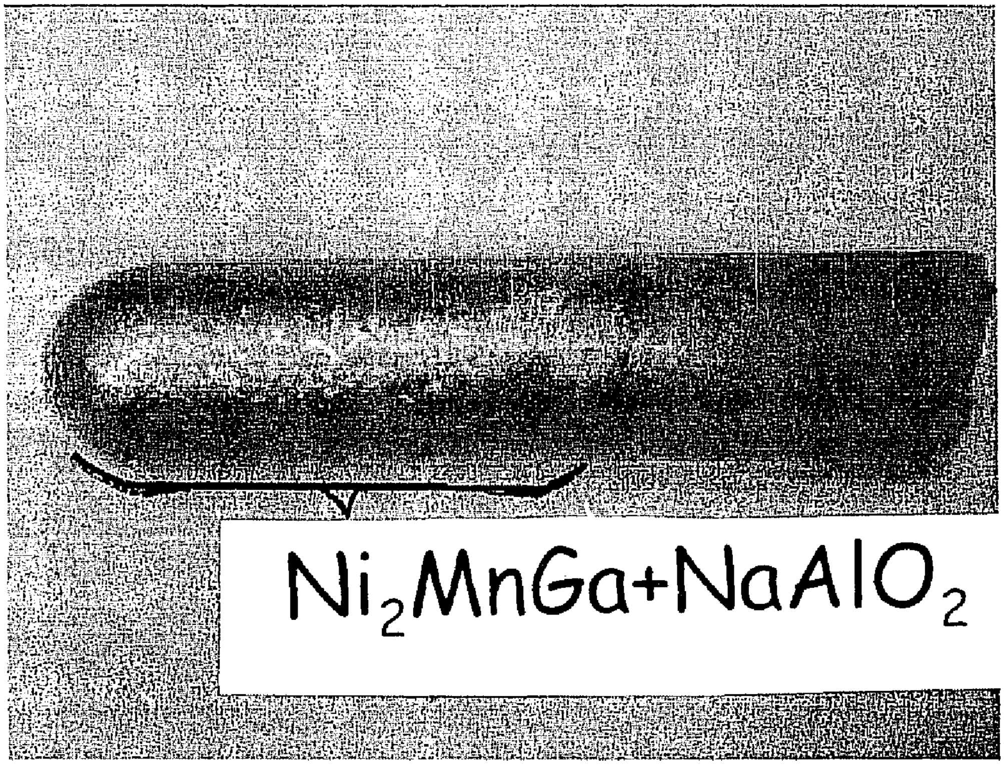
FIG. 1 is a photograph of a Ni—Mn—Ga specimen after infiltration of a $NaAlO_2$ powder perform according to an embodiment of the invention.

DETAILED DESCRIPTION OF A PREFERRED EMBODIMENT $Ni_2MnGa$ replicated foams with open-cell porous structure were processed by the replication technique where a metallic melt is cast into a bed of space-holder materials that is leached out after solidification of the melt, resulting in open porosity replicating the structure of the space-holder. This method allows the creation of foams with fully-dense struts without macroscopic distortions. This method necessitates the selection of a space-holder with higher melting point than the alloy, very low reactivity with the melt and good removal ability. This technique has been used for low-melting alloys such as aluminum (typically using NaCl with a 801° C. melting point as space-holder) and has been recently demonstrated for foams created with higher melting alloys based on zirconium (using $BaF_2$ as space-holder) or nickel (using $NaAlO_2$). In the present work, the processing follows the general procedures described in Boonyongmaneerat Y, Chmielus M, Dunard D C, Müllner P, Physical Review Letters 2007: 99: 247201—incorporated herein by reference.

A $Ni_{50.6}Mn_{28}Ga_{21.4}$ (numbers indicate atomic percent) polycrystalline ingot was produced by vacuum casting of the elements Ni, Mn, and Ga. The material exhibits solidus and liquidus temperatures of ~110° C. and ~1130° C., respectively. For the space-holder, $NaAlO_2$ powders with a size range of 355-500 μm were used, which were produced by cold pressing $NaAlO_2$ supplied by Alfa Aesar (Ward Hill, Mass.), sintering at 1500° C. for 1 hour in air, crushing and sieving. These sieved $NaAlO_2$ powders were then poured in a cylindrical alumina crucible with inner diameter 9.5 mm and sintered in air at 1500° C. for 3 hours to achieve a modest degree of bonding between the particles. Subsequently, an alumina spacer disc and the $Ni_2MnGa$ ingot were inserted into the crucible containing the sintered $NaAlO_2$ particles.

The crucible was heated to 1200° C. with a heating rate of 7° C./min, and maintained at this temperature for 15 minutes under high vacuum to insure full melting of the alloy. The melt was then infiltrated into the $NaAlO_2$ preform by applying a 80 kPa (800 mbar) pressure of 99.999% pure argon. After 3 minutes of infiltration, the system was furnace cooled under argon pressure. The total mass of preform (space holder material) and alloy was measured before and after infiltration. The weight loss was less than 0.4%. This corresponds to a maximum deviation of the final concentration compared to the ingot concentration of 0.4 atomic percent for each element. The as-cast specimen was removed from the crucible, cut into small discs with height and diameter of 3 mm and 9 mm, respectively, so that the infiltrated space-holder particles were fully exposed to the surfaces. Two specimens (A and B) were then submerged into an ultrasonically-agitated 10% HCl solution bath for 17 and 41 hours, respectively, to dissolve the space-holder.

The density of the two foams A and B was determined by helium pycnometry. Additional specimens were mounted and polished, and their microstructures were examined under optical microscopes. To observe twin relief and grain structures, the specimens were (i) heat-treated at 150° C. followed by cooling to room temperature and (ii) etched with nitric acid solution.

Four samples were prepared with the shape of a parallelepiped. The sizes were approximately 6×3×2 $mm^3$. The samples were subjected to a stepwise heat treatment (1000° C./1 h, 725° C./2 h, 700° C./10 h, 500° C./20 h) to homogenize at 1000° C. and to form the $L2_1$ order at temperatures between 725 and 500° C. For optical characterization, the samples were polished and etched in a solution of 30 vol.-% nitric acid (65% concentrated) in 70 vol.-% methanol.

Cyclic magneto-mechanical experiments were performed using a test set-up with a rotating magnetic field. Experimental details are given in Müllner P, Chernenko Va., Kostorz G, J Appl Phys 2004:95:1531—incorporated herein by reference. The sample was glued with its smallest face to a sample holder. A magnetic field of 0.97 T was rotated with up to 12,000 turns per minute. The rotation axis was perpendicular to the magnetic field direction. The sample was mounted to the sample holder such that the shortest edge of the sample was parallel to the rotation axis and the plane within which the magnetic field rotated was parallel to the largest face of the sample. The length of the longest edge of the sample was recorded as a function of field direction. For one full field rotation, magnetic shape-memory alloys expand and contract twice. One full turn of the magnetic field constitutes two magneto-mechanical cycles. The precision of the strain measurement on a 6 mm long sample is $2\times10^{-5}$ which corresponds to a relative error of 2% for a strain of $10^{-3}$. The precision of the displacement includes noise and bending due to magnetic torque.

Molten $Ni_2MnGa$ appeared to adequately wet both alumina crucible and $NaAlO_2$ particles without the presence of any adverse reaction, resulting in good infiltration of the alloy into the preform. As shown in FIG. 1, the as-cast specimen is composed of the metal-ceramic composite section at the bottom (left) and excess metal portion at the top (right). FIG. 1 is a photograph of a Ni—Mn—Ga specimen after infiltration according to an embodiment of the invention. The left part consists of a composite of space-holder ceramic and Ni—Mn—Ga foam while the right part is excess Ni—Mn—Ga alloy without spaceholder.

With the measured density of the $Ni_2MnGa$—$NaAlO_2$ composite of 5.7 g/cm$^3$ and the $NaAlO_2$ packing fraction of 36%, it is determined that the volume fraction of the metal and pore in the composite are 58% and 6%, respectively. Such low porosity value indicates that $Ni_2MnGa$ almost fully-infiltrated into the preform. The $NaAlO_2$ space-holder can be leached with 10% HCl solution fairly well, even though a thin, dark corrosive layer developed on the metal surfaces. Table 1 summarizes the final volume fractions of the materials in specimen sets A and B.

TABLE 1

Percent volume fraction of foam specimens following the dissolution treatments for 17 hours (A) and 41 hours (B).

| Sample | Pct. Volume Fraction Metal | Placeholder | Pore |
|---|---|---|---|
| A | 36 | 9 | 55 |
| B | 24 | 0 | 76 |

In set A where specimens were submerged in the acidic solution for a shorter time, the dissolution of the preform was not fully completed, leaving 9% of $NaAlO_2$ residue within the structure. Nevertheless, it is observed that porosity of 55% is already much higher than anticipated based on the space-holder density (42%), and this is because $Ni_2MnGa$ was concurrently dissolved in the acid, albeit at relatively slow rate compared to the ceramic. For specimens of set B, leaching of the space-holder is nearly complete and metal dissolution was also quite extensive, resulting in a porosity of 76%.

Figure 2A:
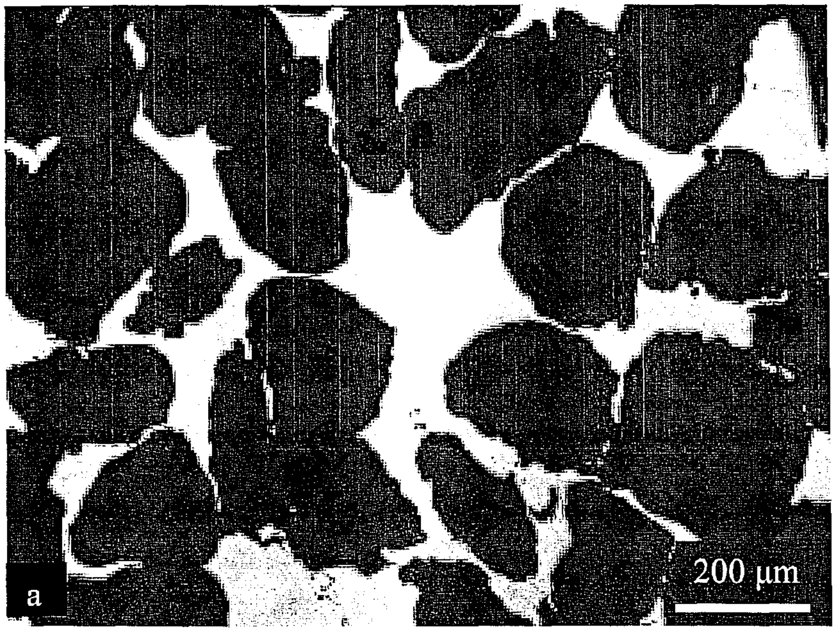
FIG. 2 is a photomicrograph of a polished cross-section of Ni—Mn—Ga foams according to the embodiment of the invention—(a) After etching for 17 hours, —(b) After etching for 41 hours.
Figure 2B:
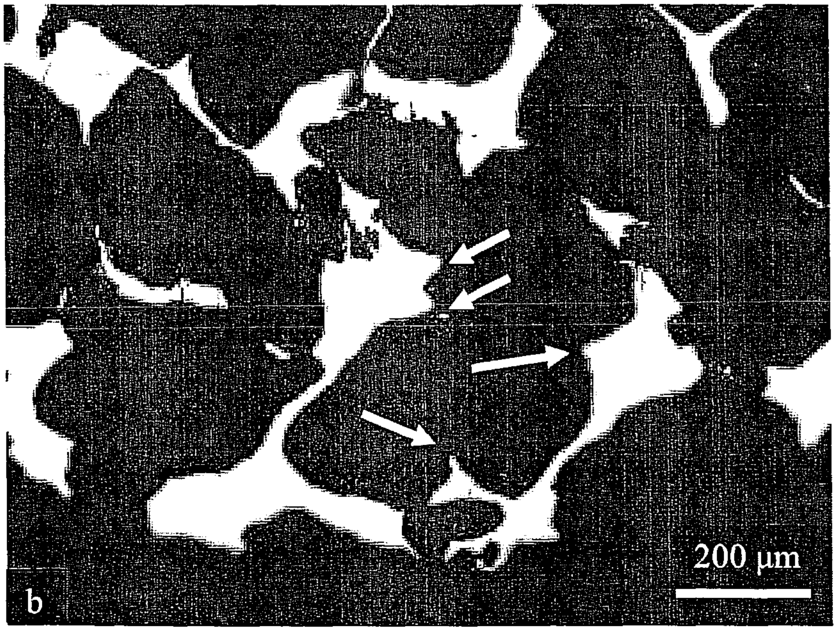

FIGS. 2*a* and 2*b* show the microstructure of specimens A and B. FIG. 2 is a photomicrograph of a polished cross-section of Ni—Mn—Ga foam according to an embodiment of the invention—(a) After etching for 17 hours—(b) After etching for 41 hours. For (a), most of the struts are intact, the pores have the size of the former space-holder grains and the porosity is 55%. For (b), which was subjected to a longer dissolution treatment, nodes and struts are thinner. In (b) many struts are dissolved, the average pore size is larger than the size of the former space-holder grains and the porosity is 76%. Arrows mark truncated struts in (b). In general, the architecture of the replicated foams can be described by nodes which are connected by relatively thin struts for a more open structure, or relatively thick walls for a more closed structure. Furthermore, nodes, walls and struts appear to be fully-dense, as expected for materials processed by casting.

Figure 3:
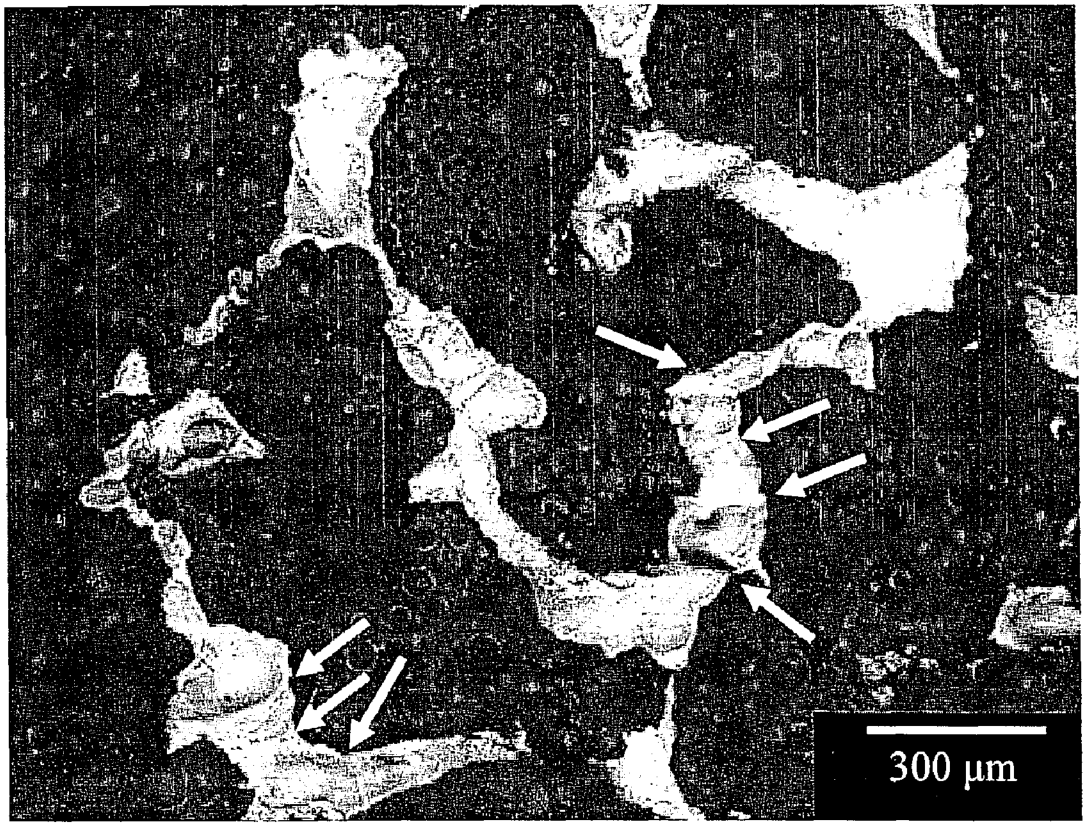
FIG. 3 is a photomicrograph of foam microstructure from FIG. 2(*b*), above, after etching, with arrows indicating grain boundaries.

The microstructure of the specimen B at room temperature after the heat treatment at 150° C. is presented in FIG. 3. FIG. 3 is a photomicrograph of foam microstructure according to an embodiment of the invention. Arrows mark some grain boundaries which expand across an entire strut. The grain boundaries subdivide struts which have a bamboo-structure. Twins are visible in several grains, and are a signature of the martensitic phase. Grain boundaries (arrows) and twin boundaries are exposed. Grains form "bamboo structures" in the struts, i.e. individual grain boundaries are extending across the entire strut. There are no grain boundary triple junctions and no grain boundaries along the longitudinal axis of struts. The grains are approximately equiaxed or globular, i.e. their length along the struts is similar to the strut diameter.

Figure 4A:
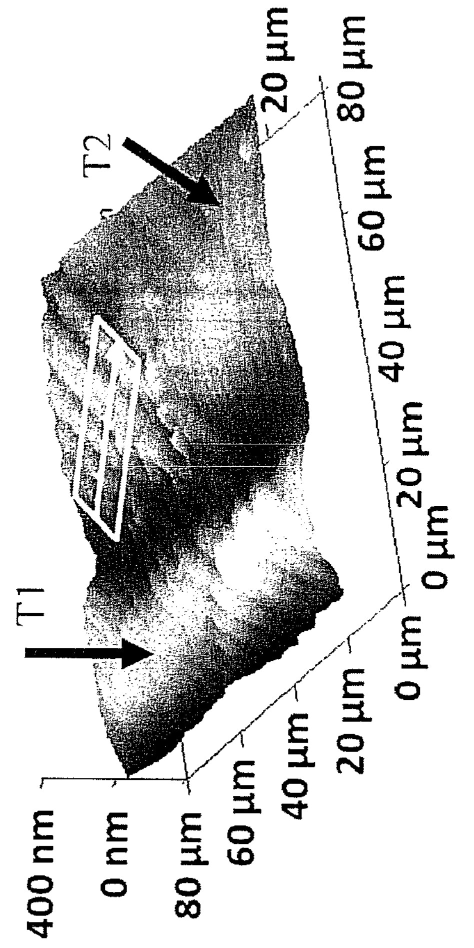
FIG. 4 is a twin structure in a strut according to an embodiment of the invention recorded with an atomic-force microscope (AFM)—(a) The height-image reveals two twin variants—(b) A surface profile indicates a twin thickness of approximately 2 μm.
Figure 4B:
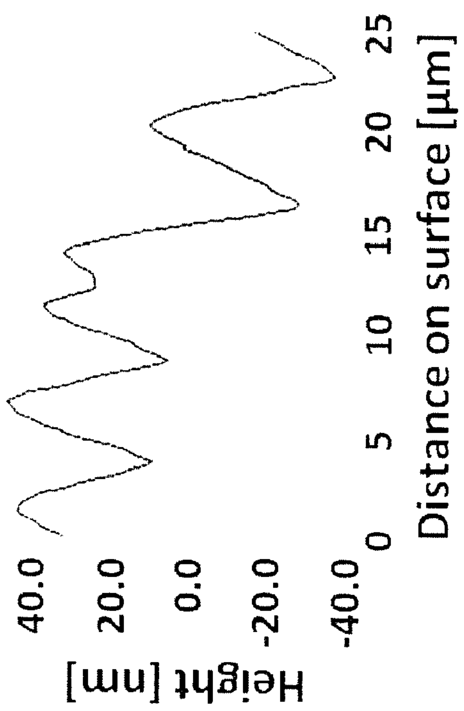

The twin structure appears more clearly as typical surface relief in an atomic force microscopy image (FIG. 4). Two twinning systems are visible in FIG. 4*a* with a twin thickness of a few micrometers. (a) The height-image reveals two twin variants T1 and T2 as indicated with black arrows. (b) Surface profile corresponding to the box in (a) indicates a twin thickness of approximately 2 μm. The presence of twin relief patterns indicates that the martensitic transformation occurs above room temperature following the fabrication of the alloy foam.

Figure 5:
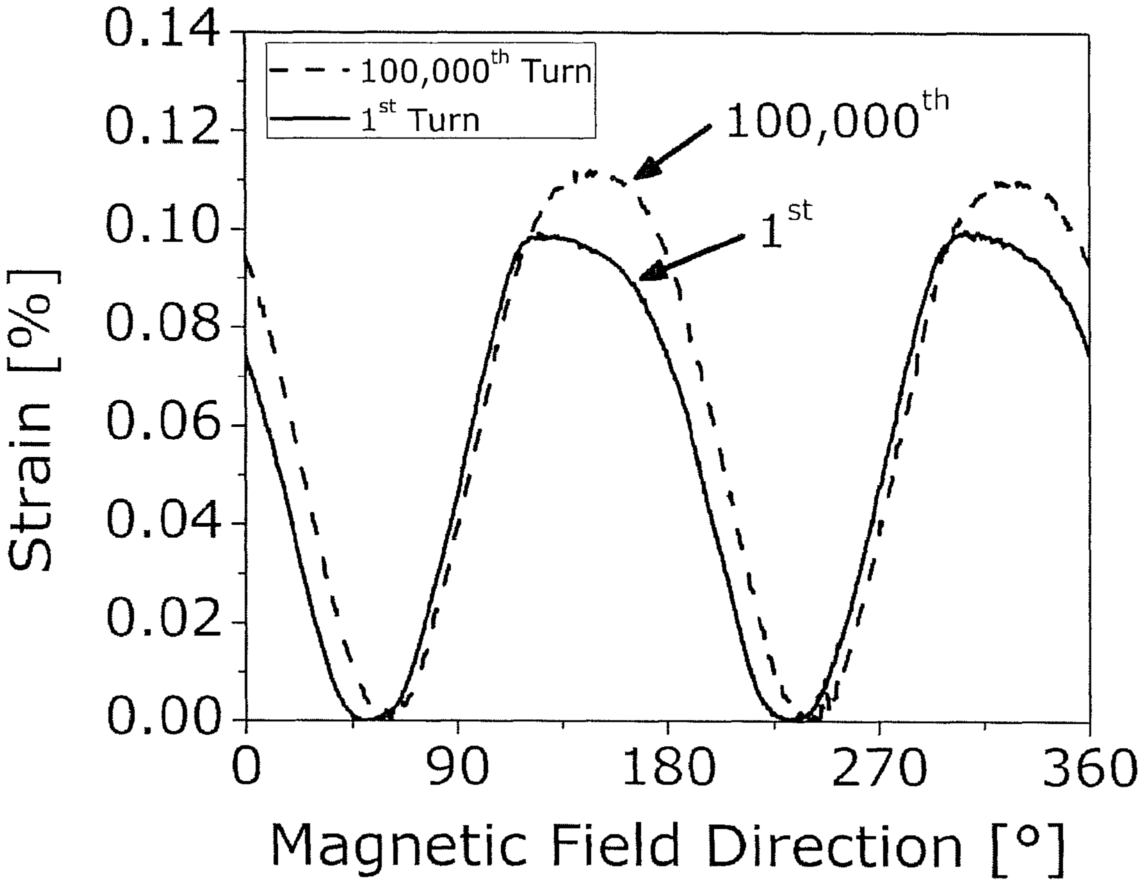
FIG. 5 is a graph of magnetic-field induced strain (MFIS) as a function of magnetic field direction for the sample from FIG. 2(*b*), above.

FIG. 5 displays results of the magneto-mechanical experiments with rotating magnetic field. FIG. 5 is a graph of magnetic-field induced strain (MFIS) of the sample from FIG. 2(*b*), plotted as a function of field direction. During one full rotation of the magnetic field, the sample expands and shrinks twice. In the first cycle (solid line), the strain is close to 0.1%. After 100,000 cycles (dashed line), the strain-angle profile changed slightly; the strain is exceeding 0.11%.

Figure 6:
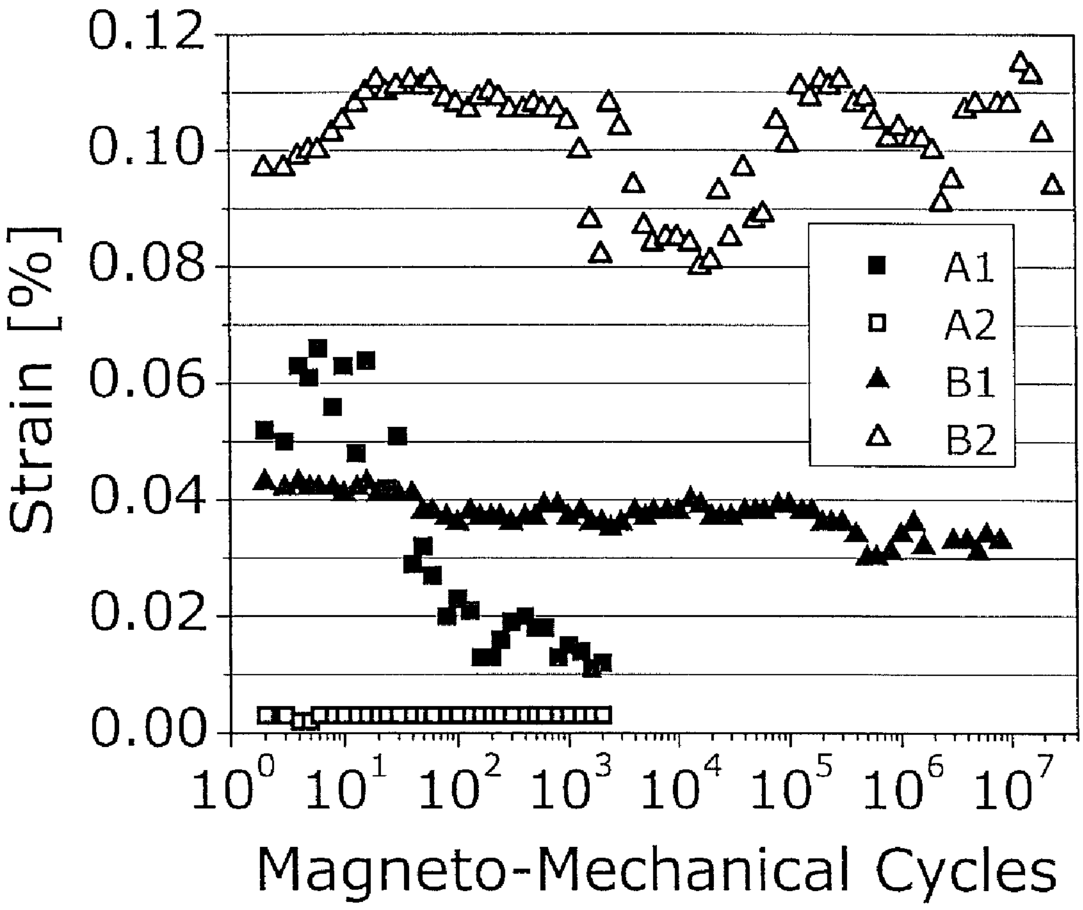
FIG. 6 is a graph of magnetic-field induced strain (MFIS) as a function of magneto-mechanical cycle number for four (4) Ni—Mn—Ga foam samples according to embodiments of the invention.

A comparison of the results of magneto-mechanical experiments of samples A1, A2, B1, and B2 is shown in FIG. 6. FIG. 6 is a graph of magnetic-field induced strain (MFIS) as a function of magneto-mechanical cycle number for embodiments of the invention. The samples with 55% porosity (A) have very small MFIS when not trained, heated and cooled with a magnetic load applied (A2) and more significant strain at the beginning when trained (A1). MFIS decays quickly for A1. Samples with 76% porosity (B) have larger MFIS, which stays constant over many magneto-mechanical cycles. The MFIS of A2 which did not undergo a thermo-magnetic treatment was 0.002% which is at the detection limit of the instrument. The sample A1, which underwent a thermo-magnetic treatment, displayed a MFIS of 0.06% during the first ten revolutions of the magnetic field. With increasing number of field revolutions, the MFIS decreased to about 0.01% after 1000 revolutions. The MFIS was largest for B2 (i.e. the sample with high porosity and without thermo-magnetic treatment). At the onset of magneto-mechanical actuation, the MFIS starts at a value of 0.097%, increases to a maximum of 0.11% where it stabilizes for nearly 1000 magneto-mechanical cycles and varies thereafter in the range between 0.08% and 0.115%. The MFIS of sample B1 is nearly constant 0.04% over up to one million magneto-mechanical cycles.

Figure 7A:
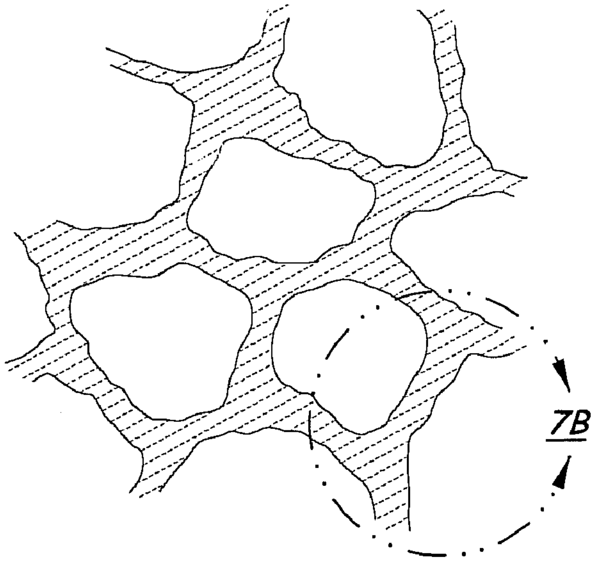
FIG. 7 is a schematic, depiction of—(a) cross-section view of an alloy foam of the present invention—(b) a detail view of the foam showing two nodes (N) which are connected by one strut (S) and—(c) a closer-up detail view of the strut (S), showing three (3) grains (G1, G2 and G3) separated by grain boundaries (GB).
Figure 7B:
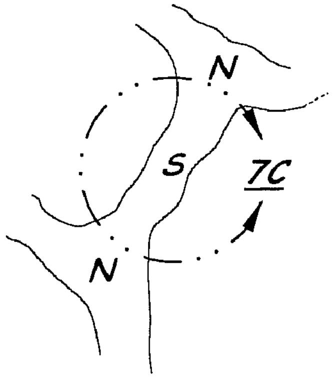
Figure 7C:
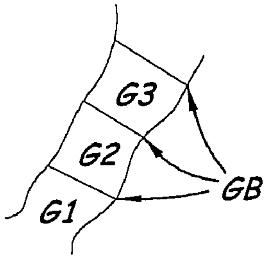

FIG. 7 is a schematic depiction of—(a) cross-section view of the metal alloy foam of the present invention—(b) a detail view of the foam showing two nodes (N) which are connected by one strut (S) and—(c) a closer-up detail view of the strut (S). The lines of the strut (S) marked with arrows are grain boundaries (GB) separating grains G1, G2 and G3. Such grain boundaries are also visible in FIG. 3, discussed above (marked also with arrows there). Grain boundaries are made visible through etching.

Figure 8A:
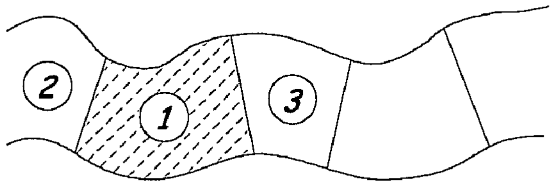
FIG. 8 is a schematic comparison of—(a) a strut containing three (3) grains with "bamboo" structure according to an embodiment of the invention and—(b) single crystal MFIS experiments with single crystal (1) pushing against a test fixture (2 and 3).
Figure 8B:
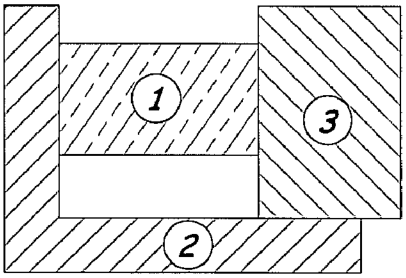

FIG. 8 is a schematic comparison of strut (a) according to an embodiment of the invention and single crystal experiments (b). In the "bamboo" microstructure, the grain boundaries of grains 2 and 3 with grain 1 impose similar constraints on grain 1 as the contact areas of sample holder (2) and sled (3) with sample (1) do in single crystal experiments (FIG. 8*b*). Therefore, individual grains in the polycrystalline struts have properties similar to single crystals rather than polycrystals. The optical analysis of the struts reveals a bamboo-like grain microstructure (FIG. 8*a*). Thus, polycrystalline struts can be viewed as a linear assembly of single crystals. In experiments with a rotating magnetic field, crystals with an aspect ratio of about 2 to 2.5 are glued on two faces to the sample holder and the sled (see FIG. 8*b*). Sample holder and sled impose constraints to the single crystal similar to the neighboring grains (number 2 and 3 in FIG. 8*a*) on an intermediate grain (number 1 in FIG. 8*a*). When single crystals are subjected to a rotating magnetic field, cyclical strains of up to 10% are measured. This strain level represents the theoretical limit $\epsilon_{max}=1-c/a=0.1$ given by the ratio of the lattice parameters a and c. Thus, the constraints in the single crystal experiments which correspond to the constraints in the bamboo-structures of the struts do not significantly affect the MFIS. This implies that an isolated strut may deform freely. The strain would be reduced only due to the different orientation of individual grains. The effect of orientation distribution is discussed below.

Figure 9A:
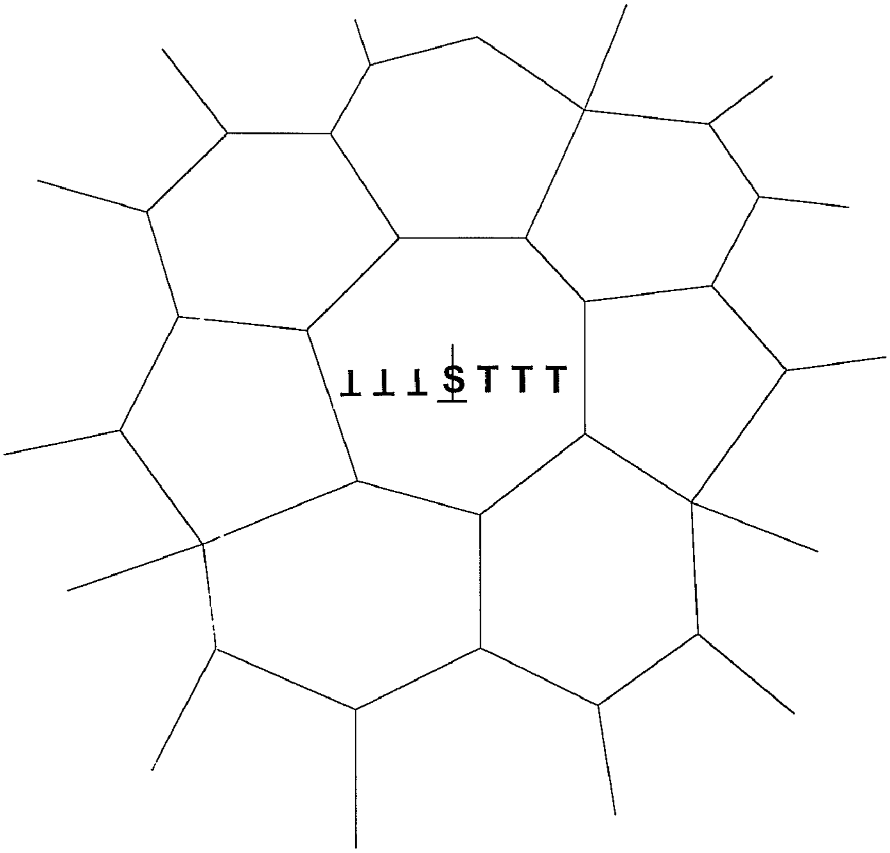
FIG. 9 is a schematic comparison of polycrystals plasticity (a) and twinning in nodes (b).
Figure 9B:
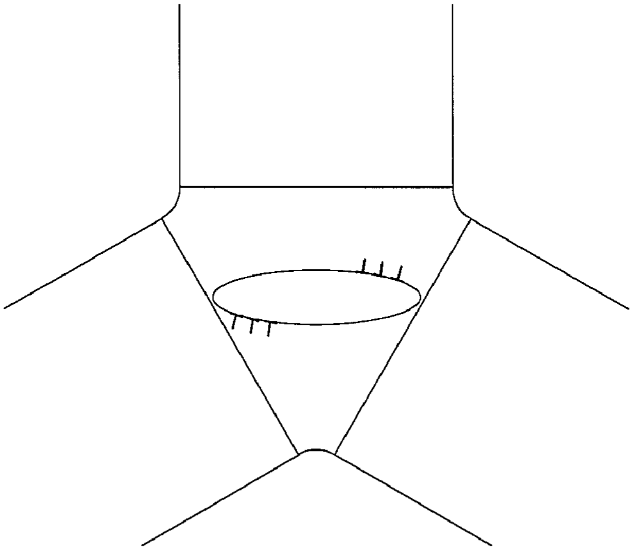

FIG. 9 is a schematic comparison of polycrystals plasticity (a) and twinning in nodes (b). In polycrystals, dislocations form pile-ups which produce a back-stress on dislocation sources causing significant hardening. For twinning in 'polycrystalline nodes', pile-ups of twinning dislocations suppress significant deformation. In polycrystals with individual grains fully embedded in a matrix of other grains, grain boundaries cause significant hardening. This hardening is due to the formation of dislocation pile-ups at grain boundaries, which cause a back stress on the dislocation sources (FIG. 9*a*). Magnetoplasticity is carried by twinning dislocations (more precisely twinning disconnections). The back-stress of dislocations piling up in polycrystals quickly increases the magneto-stress, which amounts to only a few MPa. Therefore, magnetoplasticity is suppressed to a large extend in polycrystals. A node in foam typically connects four struts. The grains of the struts meeting at the node make a grain structure similar to a grain embedded in a polycrystalline material (FIG. 9*b*). Therefore, nodes are constrained similarly as polycrystals and may not display magnetoplasticity.

If nodes and struts were connected in a simple serial chain, the total strain would follow a rule of mixture, i.e. the struts would deform to the fullest and the nodes would not change their shape. Foams form three dimensional networks of struts which impose more constraints than present in a simple serial chain. The rule of mixture, therefore, provides an upper limit for MFIS. Assuming foam with a regular cubic structure, strut diameter d and cell size L=fd, porosity p, volume fraction e of struts (compared to total solid volume) and the geometry parameter f are related through $$p = \frac{f^3 - 3f + 2}{f^3},\ e = \frac{3f - 3}{3f - 2} \quad (1)$$

While all nodes are effective in suppressing deformation, only the component of the struts parallel to the direction along which the strain is detected effectively contribute to the experimental strain. When assuming that the strain is measured along one of the cube directions of the cubic model foam, one third of the struts contribute to deformation. The fraction $\tilde{e}$ of solid material which contributes to deformation then is $$\tilde{e} = \frac{e/3}{1 - 2e/3} \quad (2)$$

For single crystal experiments, strain is measured in <100> direction while the magnetic field is rotated in the {001} plane. With this geometry, the theoretical limit $\epsilon_{max}$ is achievable. For polycrystalline foam, grains are oriented arbitrarily. Irrespective of orientation, any grain will be subjected to the magnetic-field-induced rearrangement of twin-variants. However, the strain depends on crystal orientation. For rotation in the {001} plane, the strain in a direction inclined by $\phi$ to the <100> direction can be approximated as $\epsilon_{max} \cos \phi$. Assuming also a cosine dependence of the strain on the inclination $\theta$ of the {001} plane with respect to the plane of rotation, the average strain of individual grains is $$\langle \varepsilon \rangle = \langle \cos\varphi \rangle \langle \cos\theta \rangle \varepsilon_{max} = \frac{\varepsilon_{max}}{2} \quad (3)$$

Equations (1) and (2) can be numerically evaluated and multiplied with the average strain given in equation (3) to yield the expectation value of the strain as a function of porosity.

Figure 10:
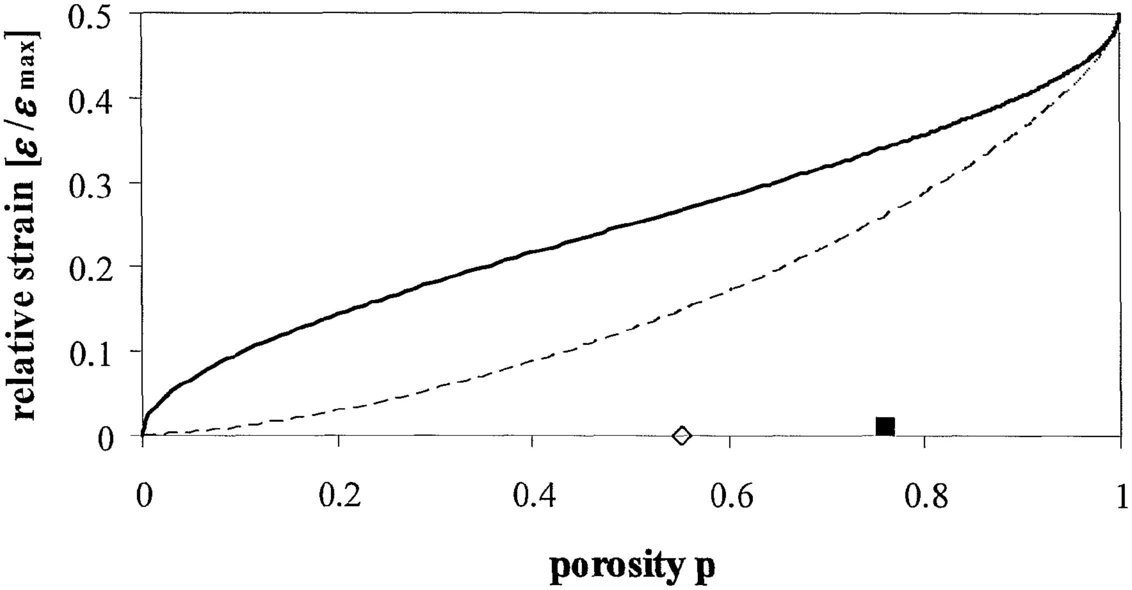
FIG. 10 is a graph depicting theoretical dependence of strain on porosity for embodiments of the invention where $\epsilon_{max}=1-c/a$ is the crystallographic limit. The diamond and square symbols present current results.

Relation (3) is displayed in FIG. 10. Without porosity, the entire sample is made of "node-material" for which magnetic-field induced strain is zero. With increasing porosity, the MFIS increases quickly at the beginning, more slowly for intermediate porosity, and again more quickly as the porosity approaches 100%. The limit of the relative strain for large porosity is controlled by the texture, in the present assumptions, the maximum value for randomly textured foam is 0.5.

The experimental results are indicated with an open diamond for the sample with lower porosity (55% porosity, 0.002% MFIS, $\epsilon/\epsilon_{max}$=0.0002) and a solid square for the sample with higher porosity (76% porosity, 0.11% MFIS, $\epsilon/\epsilon_{max}$=0.011). While the trend of increasing strain with increasing porosity is following the model, there is a clear numerical discrepancy between experiment and model. The model predicts a strain roughly thirty times the experimental finding for the sample with 76% porosity.

The model assumes that the strain is proportional to the fraction of struts parallel to the direction of strain measurement. This is a good approximation for foam with all struts connected 'in series'. In such a case, there is no mutual interaction between struts. In reality, however, struts form a network. Some of the struts are linked 'in parallel'. For very large porosity ($p \approx 1$ and $f \gg 1$, i.e. when thin struts are spaced at large distance), there is little sterical hindrance and the effect of texture is still well described with a rule of mixture. For smaller porosity, however, sterical hindrance will reduce the strain significantly. For porosity 55% and 76%, the value of f is 2.4 and 3.1. Thus, the cell diameter is about three times the strut thickness, which is in good agreement with FIG. 1. Values of 2.4 and 3.1 may be too low to justify no sterical hindrance. In a zero-order attempt to account for sterical hindrance, one may assume that the potential to deform according to the rule of mixture is proportional to the porosity which modifies Eq. 3 to $$\langle \epsilon \rangle_{steric} = p \langle \epsilon \rangle \quad (4)$$

Eq. 4 is displayed in FIG. 10 with a dashed line. FIG. 9 is a graph depicting theoretical dependence of strain on porosity for embodiments of the invention where $e_{max}$=1−c/a is the crystallographic limit. The solid line assumes no steric hindrance whereas the dashed line assumes a steric hindrance leading to a strain proportional to the porosity (Eq. 4). The symbols indicate experimental results for porosities 55% (open diamond) and 76% (solid square). The strain is reduced but not as severely as found in the experiments. Thus, sterical hindrance is stronger than reflected by Eq. 4 or/and there are further obstructions.

The model assumes perfect pores, i.e. pores which are completely empty and the surfaces of struts are clean. However, some pores of sample A are partially or completely filled with space-holder material. Struts which are connected with space-holder material are constraint similar to nodes and grains in polycrystals. Thus, these struts do not deform upon the application of a magnetic field and lead to a reduction of f and an increase of sterical hindrance. Sterical hindrance and residues of space-holder may be sufficient to significantly reduce the magnetic-field-induced deformation. Both sterical hindrance and residues may be reduced e.g. by increasing the etching time or choosing a different processing route. Therefore, it is likely that much larger MFIS will be achieved through optimizing of process parameters. For randomly textured polycrystalline foam, roughly 50% of the theoretical limit may be reached which amounts to an absolute strain of 5% in Ni—Mn—Ga with 14M (orthorhombic) structure.

The instant invention is unique regarding the combination of actuator properties. Magnetic shape-memory alloy foams combine large stroke, fast response, and light weight. Other materials might be faster but exhibit a much smaller strain (e.g. piezo ceramics) or they might exhibit larger strain but are much slower (e.g. hydraulics and thermally actuated shape-memory alloys including Nitinol). Some examples for uses of the foams according to the present invention are:

(i) Drug delivery systems where the drug is captured in the pores of the MSMA foam. The drug delivery system may be directed to a specific site using a low magnetic field. The drug may be released e.g. through (possible repeated) application of a stronger magnetic field which might be pulsed.

(ii) Micro-pump where the shape change of the pores is used to generate a variation of gas pressure.

(iii) Micro-valve for gas or liquid. The valve may be controlled through a variable magnetic field.

(iv) Active micro-damping device. The vibrations of a small system may be actively damped using the MSMA foam as a transducer element in combination with a suitable sensor and controller.

(v) Large-stroke, low force, small-weight, fast-response actuator for aeronautic and space applications. Due to the absence of gravity, actuators do not need to work against large loads. However, space applications require low weight and large stroke. Magnetic shape-memory alloys produce the largest stroke among all transducer materials and are in the form of foam particularly useful for space applications.

The only material type with similar properties regarding strain and speed known to the instant inventors is bulk single crystalline MSMA. Bulk single crystals, however, are much heavier than MSMA polycrystalline foam. Furthermore, bulk single crystals require delicate, slow, and expensive processing. Processing of MSMA polycrystalline foam is faster, cheaper, and more flexible regarding processing parameters.

Although this invention has been described above with reference to particular means, materials and embodiments, it is to be understood that the invention is not limited to these disclosed particulars, but extends instead to all equivalents within the broad scope of the following claims.

We claim:

1. A magnetic material, comprising:

a polycrystalline porous structure of the solid magnetic material;

said porous structure comprising struts connected at nodes;

said struts having twin boundaries which extend transversely across an entire strut.

2. The material of claim 1 including alloys formed from the elements Ni—Mn—Ga.

3. The material of claim 1 including alloys formed from the elements Fe—Pt.

4. The material of claim 1 including alloys formed from the elements Fe—Pd.

5. The material of claim 1 including alloys formed from the elements Ni—Co—Ga.

6. The material of claim 2 which comprises at least 10 atomic percent each of Ni, Mn and Ga.

7. A magnetic material, comprising:

a polycrystalline porous structure of the solid magnetic material;

said porous structure comprising polycrystalline struts connected at nodes;

said polycrystalline struts having grain boundaries which extend transversely across an entire strut.

8. The material of claim 7 including alloys formed from the elements Ni—Mn—Ga.

9. The material of claim 7 including alloys formed from the elements Fe—Pt.

10. The material of claim 7 including alloys formed from the elements Fe—Pd.

11. The material of claim 7 including alloys formed from the elements Ni—Co—Ga.

12. The material of claim 7 which comprises at least 10 atomic percent each of Ni, Mn and Ga.

* * * * *